US009251463B2

(12) United States Patent
Cook

(10) Patent No.: US 9,251,463 B2
(45) Date of Patent: Feb. 2, 2016

(54) KNOWLEDGE TRANSFER IN SMART ENVIRONMENTS

(75) Inventor: Diane J. Cook, Pullman, WA (US)

(73) Assignee: WSU Research Foundation, Pullman, WA (US)

( * ) Notice: Subject to any disclaimer, the term of this patent is extended or adjusted under 35 U.S.C. 154(b) by 322 days.

(21) Appl. No.: 13/538,932

(22) Filed: Jun. 29, 2012

(65) Prior Publication Data
US 2013/0006906 A1      Jan. 3, 2013

Related U.S. Application Data

(60) Provisional application No. 61/503,499, filed on Jun. 30, 2011.

(51) Int. Cl.
| G06N 5/02 | (2006.01) |
| G06K 9/00 | (2006.01) |
| G06K 9/62 | (2006.01) |

(52) U.S. Cl.
CPC .............. *G06N 5/02* (2013.01); *G06K 9/00335* (2013.01); *G06K 9/00771* (2013.01); *G06K 9/6277* (2013.01)

(58) Field of Classification Search
None
See application file for complete search history.

(56) References Cited

U.S. PATENT DOCUMENTS

| 6,608,910 | B1 * | 8/2003 | Srinivasa et al. ............... 382/100 |
| 2004/0002838 | A1 * | 1/2004 | Oliver et al. ...................... 703/2 |
| 2006/0187305 | A1 * | 8/2006 | Trivedi et al. .................. 348/169 |
| 2006/0284979 | A1 * | 12/2006 | Clarkson ........................ 348/143 |
| 2007/0161874 | A1 * | 7/2007 | Aerts ............................ 600/301 |
| 2007/0257986 | A1 * | 11/2007 | Ivanov et al. .................. 348/154 |
| 2008/0001735 | A1 * | 1/2008 | Tran .......................... 340/539.22 |
| 2009/0141982 | A1 * | 6/2009 | Suzuki .......................... 382/190 |
| 2009/0254971 | A1 * | 10/2009 | Herz et al. ....................... 726/1 |
| 2010/0063774 | A1 * | 3/2010 | Cook et al. .................... 702/181 |

OTHER PUBLICATIONS

Zheng et al., "Cross-Domain Activity Recognition", Ubicomp 2009, Sep. 30-Oct. 3, 2009, Orlando, Florida, USA.*
Wyatt, "Unsupervised Activity Recognition Using Automatically Mined Common Sense", 2005, American Association for Artificial Intelligence, AAAI-05, Proceedings of AAAI-05. pp. 21-27 Pittsburgh, PA, Jul. 2005.*
Liao et al., "Location-based Activity Recognition", Proceedings of the 19th Annual Conference on Neural Information Processing Systems (NIPS-2005), Whistler, British Columbia, Canada, Dec. 5-10, 2005, 8 pages.*
Crandall, et al. "Behaviometrics for Multiple Residents in a Smart Environment" Washington State University paper, 10 pages, published in Proceedings of the Fifth International Workshop on Human Aspects in Ambient Intelligence, as part of: Hubner, J.F., Petit, J.M., and Suzuki, E. (eds.), Proceedings of the WI/IAT2011 Workshops, Lyon. IEEE Computer Society Press, 2011.

* cited by examiner

*Primary Examiner* — Jeffrey A Gaffin
*Assistant Examiner* — Ilya Traktovenko
(74) *Attorney, Agent, or Firm* — Lee & Hayes, PLLC

(57) ABSTRACT

Activity templates are generated from one or more existing smart environments (e.g., source spaces) based on sensor data from the one or more existing smart environments that corresponds to known activities. A target activity template is then generated for a new smart environment, e.g., the target space. The source space activity templates are then mapped to the target activity templates to enable recognition of activities based on sensor data received from the target space.

20 Claims, 6 Drawing Sheets

KNOWLEDGE TRANSFER IN SMART ENVIRONMENTS

RELATED APPLICATION

This application claims the benefit of U.S. Provisional Application No. 61/503,499, filed Jun. 30, 2011, which is hereby incorporated by reference.

BACKGROUND

Smart environments include homes, apartments, workplaces, and other types of spaces that are equipped with any of a variety of types of sensors, controllers, and a computer-driven decision making process. Such smart environments enable ubiquitous computing applications including, for example, applications to support medical monitoring, energy efficiency, assistance for disabled individuals, monitoring of aging individuals, or any of a wide range of medical, social, or ecological issues. The types of sensors that may be employed to establish a smart environment may include, for example, wearable sensors that are attached to a particular user, cameras, microphones, or less obtrusive sensors (e.g., motion sensors, light sensors, etc.) that are placed at various locations within the environment. If data collected through sensors in a smart environment can be used to detect and identify various types of activities that individual users are performing, this information can be used to monitor individuals or may be used to provide context-aware services to improve energy efficiency, safety, and so on.

Before sensor data can be used to identify specific activities, a computer system supporting a smart environment must become aware of relationships among various types of sensor data and specific activities. Because the floor plan, layout of sensors, number of residents, type of residents, and other factors can vary significantly from one smart environment to another, setup of a smart environment has typically included a time-intensive learning process in which data is collected from the new smart environment, and, for example, data collected from sensors is manually labeled, to enable a computing system associated with the new smart environment to learn relationships between sensor readings and specific activities. This learning process represents an excessive time investment and redundant computational effort, which has made widespread establishment of new smart environments prohibitive.

SUMMARY

To leverage knowledge from existing smart environments to enable activity recognition in a new smart environment, activity templates are generated based on sensor data and corresponding activities recognized in the existing smart environments. One or more activity templates are then generated for the new smart environment. The activity templates from the existing smart environments are then mapped to the activity templates for the new smart environment. This mapping enables recognition of activities based on sensor data from the new smart environment based on the known activity/sensor data correlations in the existing smart environments, even if the new smart environment differs from the existing smart environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The various features described herein may, for instance, refer to device(s), system(s), method(s), and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Leveraging experience and data gathered from existing smart environments to initially train a new smart environment can significantly reduce the time and computational effort needed to establish a new smart environment. Transfer learning can be used to apply knowledge gained in existing smart environments to a new smart environment. Examples of smart environment scenarios in which such transfer learning can be used include (1) when one or more new residents move into a new smart environment, (2) when one or more residents from an existing smart environment relocate to a new smart environment, and (3) when one or more new residents move into an existing smart environment. In the first scenario, while there may be no specific information available related to either the new smart environment or the new residents, data gathered from existing smart environments can be abstracted and generalized, and applied to the new smart environment. In the second scenario, because the residents remain the same between the existing smart environment and the new smart environment, data gathered based on the residents' activities in the existing smart environment can be applied to the new smart environment, for example, by mapping sensors in the existing smart environment to sensors in the new smart environment. In the third scenario, data gathered based on previous residents' activities within the smart environment can be abstracted and applied to the new residents within the same smart environment.

Example Environment

Figure 1:
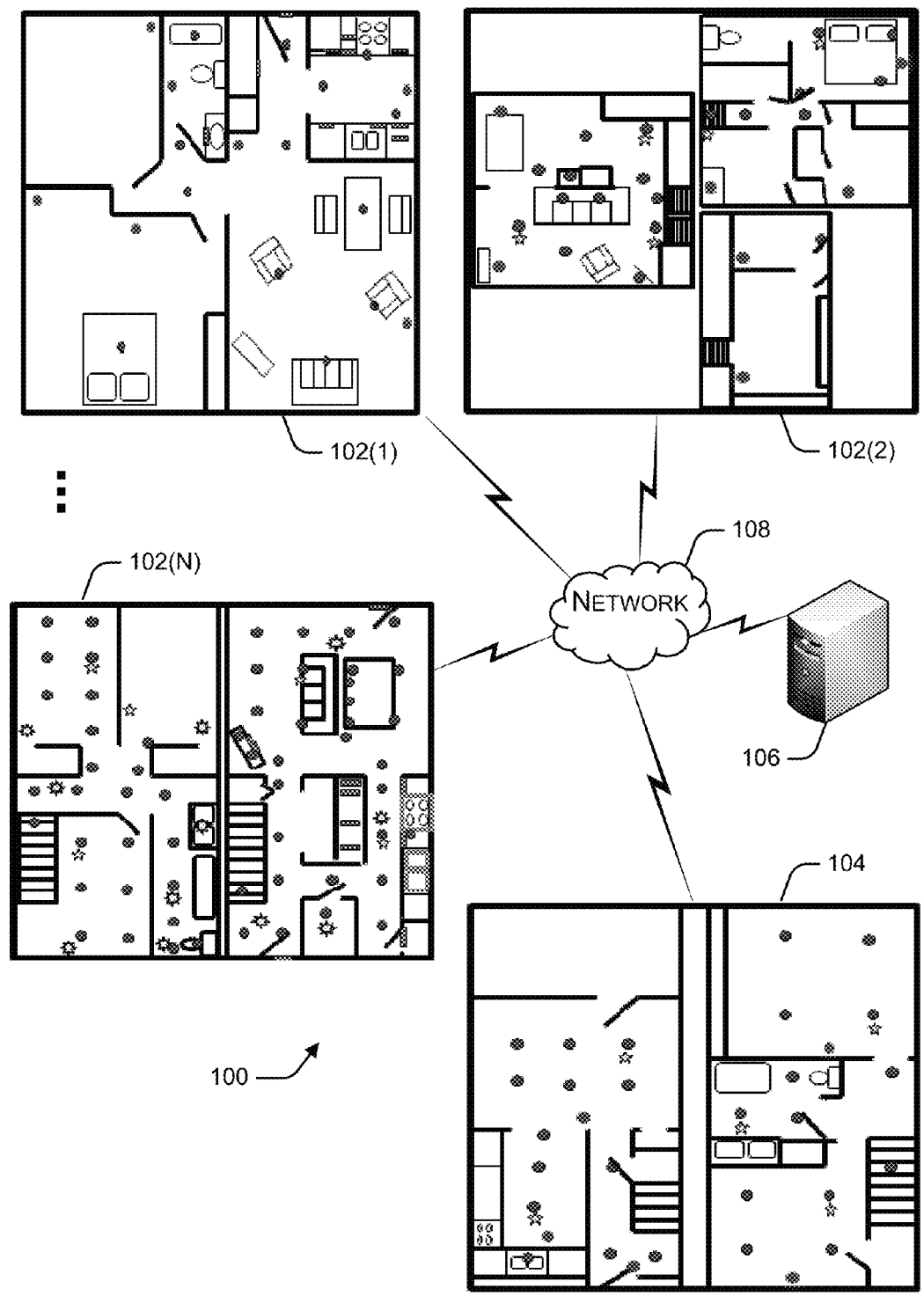
FIG. 1 is a pictorial diagram of an example environment in which knowledge transfer in smart environments may be implemented.

FIG. 1 illustrates an example environment 100 usable to implement knowledge transfer in smart environments. Example environment 100 includes a plurality of existing smart environments (e.g., source spaces) 102(1), 102(2), ..., 102(N). Example environment 100 also includes a new smart environment (e.g., target space) 104, and computing device 106. Each smart environment 102 includes a plurality of sensors that send sensor event data to computing device 106, for example, over network 108. Computing device 106 includes learned activity recognition data that enables computing device 106 to recognize various activities performed within smart environments 102.

Smart environment 104 is also equipped with a plurality of sensors. However, computing device 106 does not initially include activity recognition data associated with the new smart environment 104.

As sensor events occur in new smart environment 104, an initial set of sensor data is sent to computing device 106. Computing device 106 analyzes activity data from existing smart environments 102, and maps the activity data to sensor data received from new smart environment 104.

The mapped activity data enables activity recognition in smart environment 104 without significant manual data annotation or extensive manual sensor mapping.

Sensor Mapping

One approach to transfer learning from one or more existing smart environments to a new smart environment is to map sensors from the existing smart environments to sensors in the new smart environment. For example, if an existing smart environment and a new smart environment are both apartments, the floor plans may differ, but they will likely have a lot of similar features. For example, both environments will likely have a kitchen, a living area, at least one bedroom, and at least one bathroom. Accordingly, kitchen sensors in the existing smart environment can be mapped to kitchen sensors in the new smart environment, bathroom sensors in the existing smart environment can be mapped to bathroom sensors in the new smart environment, and so on. Based on the mappings, activities such as cooking or grooming may then be identified relatively quickly in the new smart environment based on data from the sensors in the existing smart environment being mapped to sensors in the new smart environment.

Mapping sensors from one or more existing smart environments to a new smart environment can provide meaningful transfer of knowledge if there is limited data available from existing smart environments, if the floor plans of the existing smart environments are similar to the floor plan of the new smart environment, and/or if the number and/or types of sensors used in each of the existing smart environments is similar to the number and/or types of sensors used in the new smart environment. However, directly mapping sensors from existing smart environments to a new smart environment can also be time consuming, and may be inaccurate.

Activity Recognition

One function that can be provided by smart environments is the ability to recognize specific activities. Examples of specific activities that may be recognized include, but are not limited to, sleeping, bathing, bed to toilet transition, grooming, preparing/eating breakfast, watching TV, cleaning the bathroom, working at the computer, preparing/eating lunch, preparing/eating dinner, cleaning the apartment, or studying. Activity recognition may be implemented by comparing a pattern or sequence of detected actions with predetermined patters or sequences of actions corresponding to known activities. Activity recognition provides valuable insight regarding resident behavior, and may provide tools that will enable older adults to remain at home, rather than entering a supervised nursing facility. Activity recognition can also be utilized to enable a smart environment to provide context-aware services to the environment residents. For example, activity recognition may be used to prompt environment residents to take medication, feed pets, take out the trash, turn off appliances, or the like. In an example implementation, the activities that are identified may include well-known ADLs (Activities of Daily Living). In another implementation, the activities that are identified may also include additional activities that are not included in a list of ADLs, but that occur on a frequent basis.

Various types of machine learning models may be used for activity recognition including, but not limited to, naïve Bayes classifiers, decision trees, Markov models, and conditional random fields. In an example implementation, a naïve Bayes classifier (NBC), a hidden Markov model (HMM), and a conditional random field (CRF) model are used in various combinations. These three approaches are traditionally robust in the presence of a moderate amount of noise, are designed to handle sequential data, and generate probability distributions over the class labels.

The NBC uses relative frequencies of feature values (e.g., the duration of an activity, a previous activity, sensor event frequencies, etc.) as well as a frequency of activity labels found in sample training data to learn a mapping from activity features, D, to an activity label, a, calculated using the formula:

$$\arg\max_{a\,\in\,A} P(a|D) = P(D|a)P(a)/P(D)$$

The HMM is a statistical approach in which the underlying model is a stochastic Markovian process that is not observable (i.e., hidden), which can be observed through other processes that produce a sequence of observed features. In an example implementation, hidden nodes represent activities while observable nodes represent combinations of observable features (e.g., sensor events). Probabilistic relationships between hidden nodes and observable nodes and probabilistic transitions between hidden nodes are estimated by a relative frequency with which these relationships occur in given sample data. In other words, given an input sequence of sensor events, an algorithm identifies a most likely sequence of hidden states, or activities, which could have generated the observed event sequence. In an example implementation, a Viterbi algorithm is used to identify the sequence of hidden states.

The CRF model makes use of transition likelihoods between states and emission likelihoods between activity states and observable states to output a label for a current data point. The CRF learns a label sequence, A, which corresponds to an observed sequence of features. Weights, which are learned through an expectation maximization process based on training data, are applied to each of the transition and emission features.

Testing has shown that the accuracy of the three above-described activity recognition models may vary significantly between individual activities and may be affected by the amount of available data, the quality of provided data labels, a number of residents within a particular smart environment, and a consistency of activities being performed.

Abstracting Activity Models

Data gathered from a plurality of existing smart environments can be used to create an activity model that includes information based on structural, temporal, and spatial features of various activities. Sensor events from a plurality of existing smart environments that may use any of the above models for activity recognition can be combined, and the models can be generalized by creating uniform sensor labels and differentiating different types of sensors. Combining data from existing smart environments with labeled test data from a new smart environment is one way in which to improve activity recognition in the new smart environment. However, as discussed above, generating labeled test data from the new smart environment can be time intensive and prohibitive for large-scale smart environment deployment.

With no labeled test data available for the new smart environment, the accuracy of combined data from existing smart environments as applied to the new smart environment can vary significantly. However, by constructing an ensemble of classifiers the strengths of each individual classification model is harnessed, and the data accuracy in the new smart environment can be improved.

In an example implementation, the NBC, HMM, and CRF models are used as base classifiers, and a boosted decision tree is used as a top classifier. The input features to the top classifier are the probability distributions that the three based models output for each of the activity label possibilities and the activity feature values. In addition, dataset-descriptive features are also input including the size of the environment (e.g., small, medium, large) and the number of residents. While the ensemble of classifiers frequently works well with a large set of data is available from existing smart environments, it may, in some instances, yield increased accuracy with the addition of unlabeled test data from the new smart environment.

For example, if an abstracted activity model based on the ensemble of classifiers, as described above, yields less than desirable accuracy when applied to a new smart environment, the addition of unlabeled test data from the new smart environment may provide increased accuracy. In this implementation, a semi-supervised learning method is employed in the new smart environment. Data is gathered from sensors within the new smart environment, and this data is labeled using the ensemble classifier. This newly labeled data is then added to the set of training data from the other existing smart environments, and the new set of training data is then applied to the new smart environment.

Example Computing Device

Figure 2:
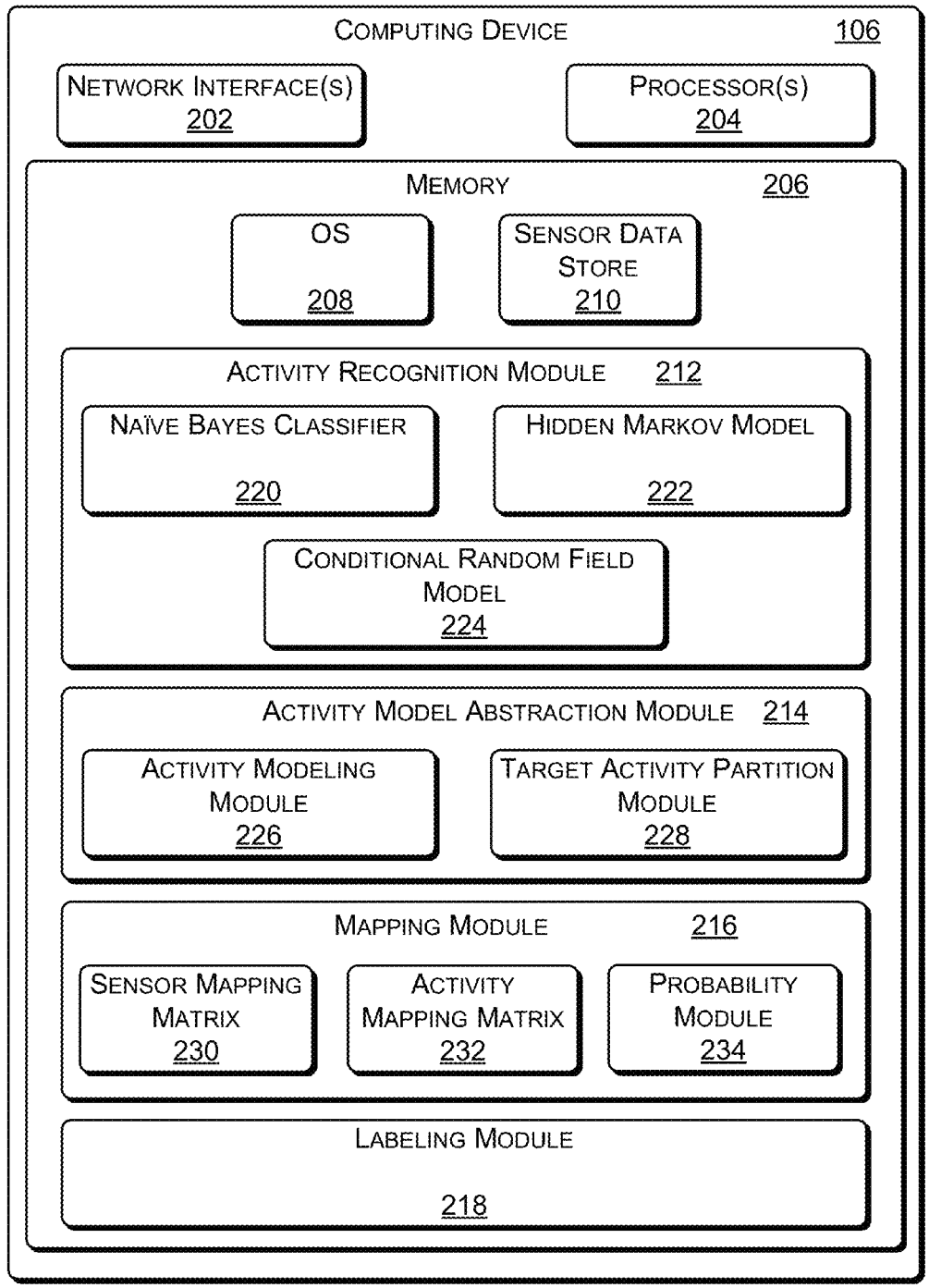
FIG. 2 is a block diagram that illustrates example components of a computing device configured to support knowledge transfer in smart environments.

FIG. 2 illustrates an example computing device 106 for implementing knowledge transfer in smart environments as described herein.

Example computing device 106 includes network interface(s) 202, processor(s) 204, and memory 206. Network interface(s) 202 enable computing device 106 to receive and/or send data over a network, for example, as illustrated and described above with reference to FIG. 1. Processor(s) 204 are configured to execute computer-readable instructions to perform various operations. Computer-readable instructions that may be executed by the processor(s) 204 are maintained in memory 206, for example, as various software modules.

In an example implementation, memory 206 may maintain any combination or subset of components including, but not limited to, operating system 208, sensor data store 210, activity recognition module 212, activity abstraction module 214, mapping module 216, and labeling module 218. Sensor data store 210 may be implemented to store data that is received from one or more sensors implemented in one or more smart environments.

Example activity recognition module 212 includes one or more models for analyzing received sensor data to identify activities that have been performed by a resident within a smart environment. In the illustrated example, activity recognition module 212 includes a naïve Bayes classifier (NBC) 220, hidden Markov model 222, and conditional random field model 224. In various implementations, activity recognition module 212 may include different, more, or fewer activity recognition models.

Example activity model abstraction module 214 includes activity modeling module 226 and target activity partition module 228. Activity modeling module 226 processes multiple activities recognized from source spaces, and generates an activity model for each identified activity. Target activity partition module 228 partitions unlabeled sensor data from a target space into possible activities. For example, sensor data that is generated in close succession is grouped together based on sensor location to approximate activities that may have occurred within the target space.

Example mapping module 216 includes sensor mapping matrix 230, activity mapping matrix 232, and probability module 234. Sensor mapping matrix 230 is employed to map sensors in source spaces to sensors in a target space. In an example implementation, the sensor mapping matrix 230 is initialized based on sensor location tags. Activity mapping matrix 232 is employed to map activities recognized in source spaces to activities identified in a target space. Probability module 234 iteratively updates the sensor mapping matrix 230 and the activity mapping matrix 232 based on sensor mapping probabilities and activity mapping probabilities.

Labeling module 218 assigns activity labels to activities that are learned in the target space.

Example Operation

FIGS. 3-6 illustrate an example process 300 for implementing transfer knowledge in smart environments, as described herein. This process is illustrated as a collection of blocks in a logical flow graph, which represents a sequence of operations that can be implemented in hardware, software, or a combination thereof In the context of software, the blocks represent computer-executable instructions stored on one or more computer storage media that, when executed by one or more processors, cause the processors to perform the recited operations. Note that the order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, while this process is described with reference to the mobile device 106 described above with reference to FIG. 1 and FIG. 2, other computer architectures may implement one or more portions of this process, in whole or in part.

Figure 3:
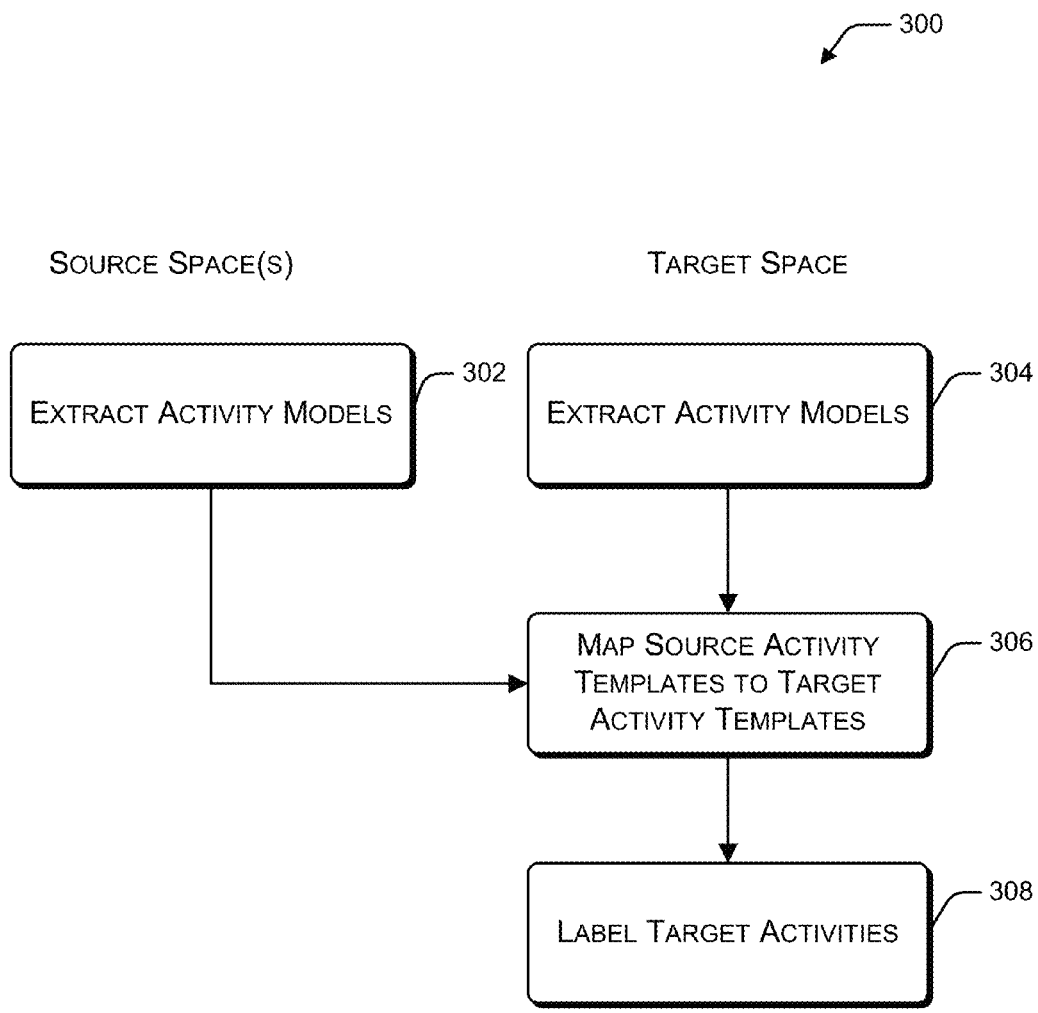
FIG. 3 is a flow diagram of an example process for transferring activity recognition information from one or more source smart environments to a target smart environment.

FIG. 3 illustrates an example process 300 for transferring activity recognition information from one or more source smart environments to a target smart environment.

At block 302, activity models are extracted from each of the available source spaces (i.e. existing smart environments). For example, activity recognition module 212 processes sensor data from each of the available source spaces to identify various activities. Activity modeling module 226 then builds activity models from the identified activities. In an example implementation, each modeled activity, a, is denotes as:

$$a = \langle \varepsilon, l, t, d, \mathcal{L} \rangle$$

where $\varepsilon$ is a sequence of n sensor events, l is an activity label, t and d are the start time and duration of the activity, and $\mathcal{L}$ represents a set of location tags where the activity has occurred. For example, a "relax" activity may occur in a living room, a bedroom, and a kitchen. Furthermore, the start time and duration may be represented as mixed normal distributions to represent a model of multiple individual activities.

At block 304, activity models are extracted from the target space (i.e., new smart environment). For example, target activity partition module 228 partitions sensor data received from the target space by location to identify possible activities. Because activity recognition has not yet been learned for the target space, the sensor data received from the target space is typically unlabeled. In an example implementation, the unlabeled data is partitioned based on sensor location. For example successive sensor events are first identified based on time. The successive sensor events are then grouped as activities based on sensor location. For example, if two successive sensor events are received from two sensors that are both located in the kitchen, then those sensor events will be grouped as a single activity. In contrast, if two successive sensor events are received from sensors in separate locations, then those successive sensor events will not be grouped as a single activity. For example, a first resident may trigger a sensor event in the kitchen, and a second sensor event may be triggered in close succession by a second resident in a bedroom. Because the sensors are not in the same location, they are not grouped as a single activity.

At block 306, source activity templates are mapped to target activity templates. For example, mapping module 216 iteratively maps activities and sensors between the source spaces and the target spaces. Initial activity mappings are used to generate initial sensor mappings. The sensor mappings are then used to refine the activity mappings, which are then used to refine the sensor mappings, and so on.

At block 308, target activities are labeled. For example, labeling module 218 assigns an activity label to each identified target activity.

Figure 4:
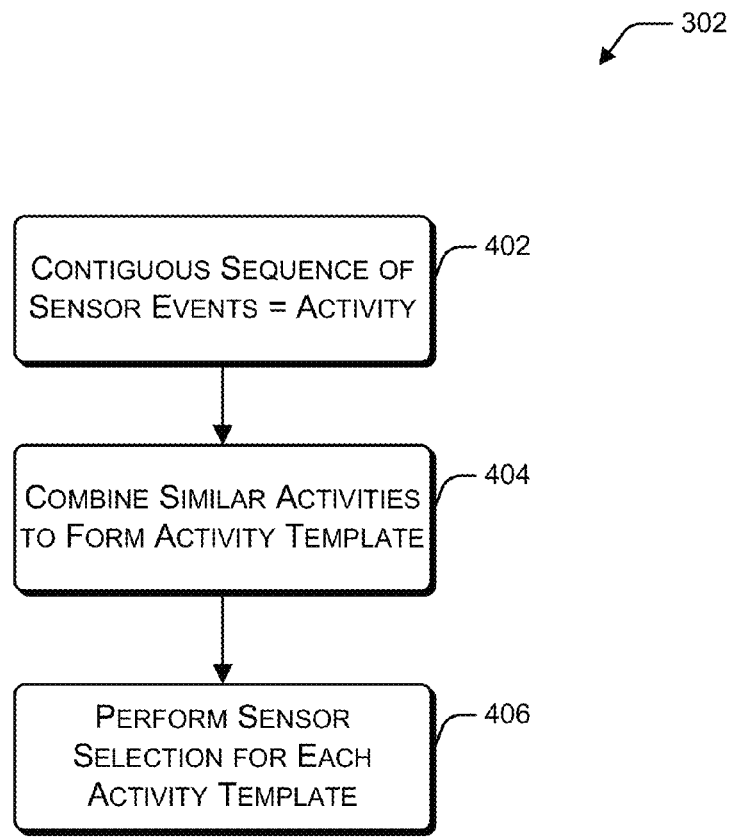
FIG. 4 is a flow diagram that illustrates an example process for extracting activity models from a source space.

FIG. 4 illustrates an example process 302 for extracting activities from source space sensor data.

At block 402, sensor data gathered from a source space is analyzed, and each contiguous sequence of sensor events is defined as an activity. For example, activity recognition module 212 is employed to analyze incoming sensor data, and identify groups of sensor data as individual activities.

At block 404, similar activities are combined to form activity templates. For example, activity modeling module 226 combines similar activity models to generate activity templates. In an example implementation, activity modeling module 226 merges source activities that have the same label into a single activity template.

At block 406, sensor selection is performed for each activity template. For example, activity modeling module 226 identifies the sensors in the source locations that are associated with each activity template. For example, if a sleeping activity template is created, sensors that are located in the bedroom will likely be associated with the activity template, while sensors located in the kitchen will likely not be associated with the activity template.

Figure 5:
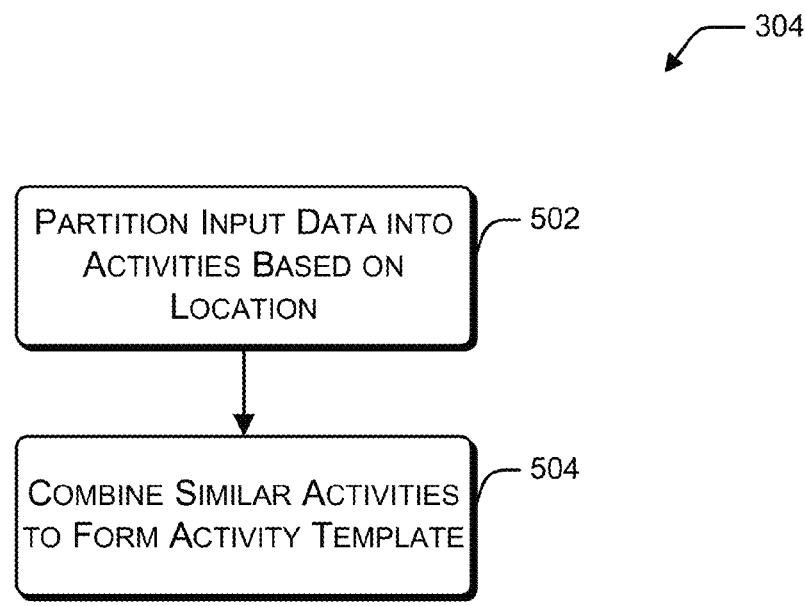
FIG. 5 is a flow diagram that illustrates an example process for extracting activity models from a target space.

FIG. 5 illustrates an example process 304 for extracting activities from target space sensor data.

At block 502, sensor data gathered from a target space is analyzed and partitioned into activities based on sensor location. For example, target activity partition module 228 analyzes sensor data received from the target space, identifies successive sensor events, and groups successive sensor events based on sensor location.

At block 504, similar activities are combined to form activity templates. For example, target activity partition module 228 combines activities using an incremental clustering method. A similarity threshold value is used to determine whether two activities are similar enough to be combined, or are dissimilar enough to represent two different activities.

Figure 6:
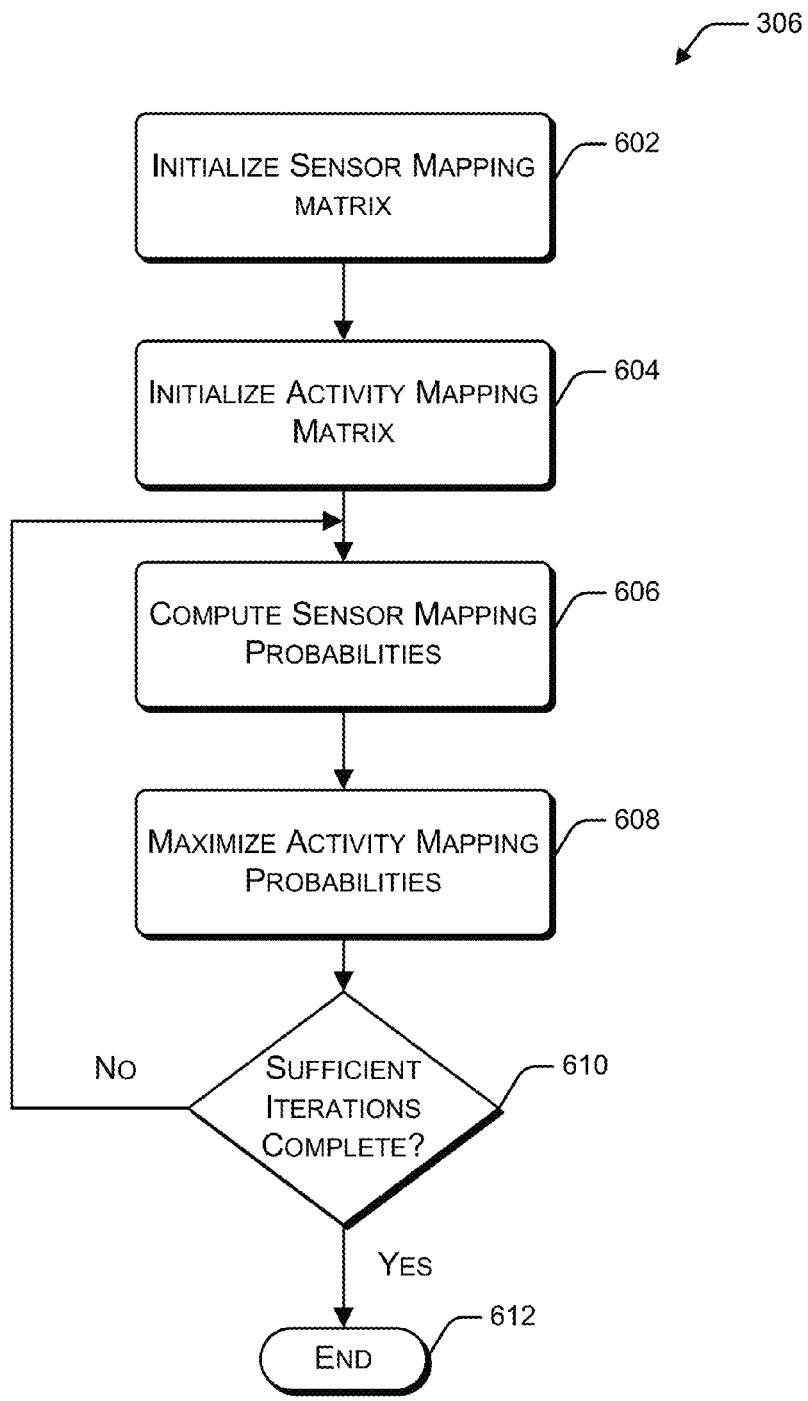
FIG. 6 is a flow diagram that illustrates an example process for mapping source activity templates to target activity templates.

FIG. 6 illustrates an example process 306 for mapping activity templates from source spaces to activity templates in a target space.

At block 602, a sensor mapping matrix is initialized. For example, sensor mapping matrix 230 is initialized to represent mappings between each source sensor and each target sensor. In an example implementation, a source sensor and a target sensor are mapped (initialized to a value of 1.0) if both sensors have the same location tag. A mapping between the source sensor and the target sensor is initialized to a value of 0 if the sensors have different location tags.

At block 604, an activity mapping matrix is initialized. For example, activity mapping matrix 232 is initialized to represent mappings between each source activity template and each target activity template. Source activity templates are mapped to target activity templates based on spatial and temporal similarities between the activity templates.

At block 606, sensor mapping probabilities are computed. For example, for each sensor pair in sensor mapping matrix 230, probability module 234 determines a probability that the sensors correspond to one another based on relationships between activities in which the two sensors appear, as defined in activity mapping matrix 232. For example if activity mapping matrix indicates a large number of mapped activities that include the two sensors, then the probability of the two sensors corresponding is increased. In contrast, if two sensors appear in very few mapped activities, then the probability of the two sensors corresponding may be decreased.

At block 608, activity mapping probabilities are maximized based on the sensor mappings. For example, after the sensor mapping matrix is updated based on the calculated sensor mapping probabilities, probability module 234 performs a similar analysis against the sensor mapping matrix 230 to update the activity mapping matrix 232.

At block 610, a determination is made as to whether or not sufficient iterations have been completed. For example, iterations may continue until no changes are perceived or until a predefined number of iterations is reached. If additional iterations are deemed appropriate (the "No" branch from block 610), then processing continues as described above with reference to block 606. If it is determined that sufficient interactions have already been completed (the "Yes" branch from block 610), then at block 612, template mapping is completed.

Conclusion

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims

What is claimed is:

1. A method comprising:
generating source activity templates from a plurality of source spaces, wherein generating source activity templates from a plurality of source spaces comprises:
receiving sensor event data from a plurality of source spaces;
recognizing activities based on contiguous sequences of sensor events from the plurality of source spaces; and
combining similar activities to form source activity templates;
generating target activity templates for a target space;
mapping the source activity templates to the target activity templates based in part on at least one of:
spatial similarities between the activities of the source activity templates and activities associated with the target activity templates, or
temporal similarities between the activities of the source activity templates and activities associated with the target activity templates; and
labeling the target activity templates to enable recognition of activities based on sensor data from the target space.

2. A method as recited in claim 1, wherein generating source activity templates from a plurality of source spaces further comprises:
performing sensor selection for each source activity template to identify particular sensors in the plurality of source spaces that are associated with each source activity template.

3. A method as recited in claim 1, wherein generating target activity templates from a target space comprises:
receiving sensor event data from a target space;
portioning the sensor event data into activities based on sensor location; and
combining similar activities to form target activity templates.

4. A method as recited in claim 1, wherein mapping the source activity templates to the target activity templates comprises:
initializing a sensor mapping matrix;
initializing an activity mapping matrix;
computing sensor mapping probabilities; and
maximizing activity mapping probabilities.

5. A method as recited in claim 4, further comprising iteratively repeating the computing and maximizing.

6. A method as recited in claim 4, wherein initializing the sensor mapping matrix comprises mapping a source sensor to a target sensor when the source sensor and the target sensor have a same location tag.

7. A method as recited in claim 4, wherein initializing the activity mapping matrix comprises mapping a source activity to a target activity when a similarity between the source activity and the target activity exceeds a threshold value.

8. A method as recited in claim 7, wherein the similarity between the source activity and the target activity is based on activity start time.

9. A method as recited in claim 7, wherein the similarity between the source activity and the target activity is based on activity duration.

10. A method as recited in claim 7, wherein the similarity between the source activity and the target activity is based on activity location.

11. A method as recited in claim 7, wherein the similarity between the source activity and the target activity is based on activity structure in terms of sensors.

12. One or more non-transitory computer readable media encoded with computer-executable instructions that, when executed, configure a computer system to perform a method as recited in claim 1.

13. A computing device comprising:
a processor;
a memory communicatively coupled to the processor;
an activity recognition module, at least partially stored in the memory and executable on the processor, to recognize activities based on received sensor data from a smart environment;
an activity model abstraction module to generate source activity templates based on activities recognized from sensor data received from a plurality of smart environments; and
a mapping module to map the source activity templates to target activity templates associated with a new smart environment based in part on at least one of:
spatial similarities between the source activity templates and the target activity templates, or
temporal similarities between the source activity templates and the target activity templates.

14. A system comprising:
one or more processors;
one or more computer-readable media;
a plurality of source spaces in a first smart environment;
a plurality of target spaces in a second smart environment;
processor-executable instructions maintained on the one or more computer-readable media which, when executed by the one or more processors, program the one or more processors to:
receive labeled sensor event data from the source spaces;
determine source activities from the labeled sensor event data based at least in part on grouping contiguous sequences of sensor events occurring in proximity to one another;
generate a source activity template for the first smart environment based at least in part on the source activities;
receive unlabeled sensor event data from the target spaces;
determine target activities from the unlabeled sensor event data based at least in part on grouping contiguous sequences of sensor events occurring in proximity to one another;
generate a target activity template for the second environment based at least in part on the source activities; and
map the source activity template to the target activity template based at least in part on at least one of:
spatial similarities between the source activity template and the target activity template, or
temporal similarities between the source activity template and the target activity template.

15. A system as recited in claim 14, wherein the one or more processors are further programmed to label the target activity template.

16. A system as recited in claim 14, wherein mapping the source activity template to the target activity template, further comprises:
initializing a sensor mapping matrix to represent a mapping between a first sensor in the plurality of source spaces and a second sensor in the plurality of target spaces, wherein the first sensor is associated with the source activity template and the second sensor is associated with the target activity template;
initializing an activity mapping matrix to represent a mapping between the source activity template and the target activity template;
determining sensor mapping probabilities based at least in part on a probability that the first sensor corresponds to the second sensor; and
maximizing activity mapping probabilities based at least in part on the sensor mapping probabilities.

17. A system as recited in claim 16, wherein initializing a sensor mapping matrix to represent the mapping between the first sensor in the plurality of source spaces and the second sensor in the plurality of target spaces, further comprises determining a mapping value based at least in part on a first location tag associated with the first sensor and a second location tag associated with the second sensor.

18. A system as recited in claim 16, wherein determining sensor mapping probabilities based at least in part on a probability that the first sensor corresponds to the second sensor, further comprises determining a probability value based at least in part on a relationship between a plurality of source activity templates associated with the first sensor and a plurality of target activity templates associated with the second sensor.

19. A system as recited in claim 14, wherein determining source activities from the labeled sensor event data is based in part on at least one of a naïve Bayes classifier, hidden Markov model, and conditional field model.

20. A system as recited in claim 14, wherein generating the target activity template for the second environment further comprises combining the target activities into the target activity template based at least in part on a similarity value associated with the target activities exceeding a predetermined threshold.

* * * * *